US008270081B2

(12) United States Patent
Huff

(10) Patent No.: US 8,270,081 B2
(45) Date of Patent: Sep. 18, 2012

(54) METHOD OF REFLECTING IMPINGING ELECTROMAGNETIC RADIATION AND LIMITING HEATING CAUSED BY ABSORBED ELECTROMAGNETIC RADIATION USING ENGINEERED SURFACES ON MACRO-SCALE OBJECTS

(75) Inventor: Michael A Huff, Oakton, VA (US)

(73) Assignee: Corporation For National Research Initiatives, Reston, VA (US)

( * ) Notice: Subject to any disclaimer, the term of this patent is extended or adjusted under 35 U.S.C. 154(b) by 429 days.

(21) Appl. No.: 12/292,004

(22) Filed: Nov. 10, 2008

(65) Prior Publication Data

US 2010/0118407 A1  May 13, 2010

(51) Int. Cl.
*G02B 1/10* (2006.01)
(52) U.S. Cl. .................................. 359/584; 359/586

(58) Field of Classification Search .................. 359/359, 359/584, 586, 588, 589; 356/5.01
See application file for complete search history.

(56) References Cited

U.S. PATENT DOCUMENTS

| | | | | |
|---|---|---|---|---|
| 4,147,409 A * | 4/1979 | Apfel | ............................ | 359/584 |
| 4,309,075 A * | 1/1982 | Apfel et al. | ..................... | 359/586 |
| 6,208,466 B1 * | 3/2001 | Liu et al. | ...................... | 359/584 |
| 7,903,338 B1 * | 3/2011 | Wach | ............................ | 359/588 |
| 2002/0060847 A1 * | 5/2002 | Joannopoulos et al. | ...... | 359/584 |
| 2007/0238073 A1 * | 10/2007 | Portoghese et al. | ............ | 434/21 |

* cited by examiner

*Primary Examiner* — Alessandro Amari
(74) *Attorney, Agent, or Firm* — Nixon & Vanderhye, PC

(57) ABSTRACT

A method of reflecting impinging electromagnetic radiation by using engineered surfaces of alternating layers of materials having different indices of refraction is described. These layers can be fabrication or applied onto the surfaces of macro-scale objects. Also, a method of limiting the heating within the interior of an object being impinged upon by electromagnetic radiation is described.

44 Claims, 10 Drawing Sheets

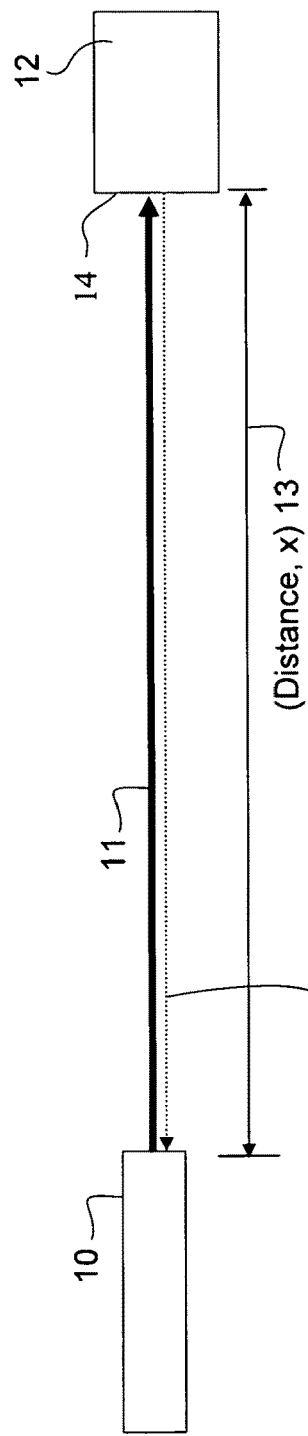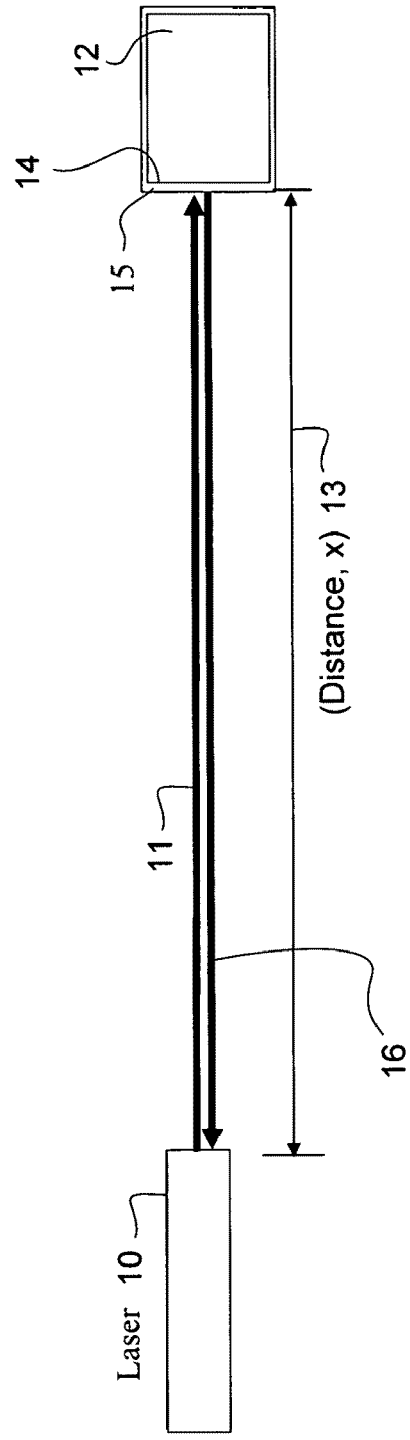

US 8,270,081 B2

METHOD OF REFLECTING IMPINGING ELECTROMAGNETIC RADIATION AND LIMITING HEATING CAUSED BY ABSORBED ELECTROMAGNETIC RADIATION USING ENGINEERED SURFACES ON MACRO-SCALE OBJECTS

FIELD OF INVENTION

The present invention relates to methods of forming engineered surfaces that can better reflect electromagnetic radiation impinging on an object's surface and limit heating of the interior of an object.

BACKGROUND OF THE INVENTION

The interaction of objects, whether stationary or mobile, with directed electromagnetic radiation beams has been studied and used in a variety of applications for several decades. One application is a rangefinder, which is a device that measures distance from an observer to an object, for the purposes of surveying, determining the correct focus, accurately aiming, etc. These electromagnetic-based rangefinders can be used to determine the range of an object nearly instantaneously, and with great accuracy.

Directed electromagnetic radiation sources of sufficient power levels can also be used to modify the surfaces of objects upon which they impinge. A variety of physical phenomena occur when a directed electromagnetic radiation source of sufficient power level impinges on an object, including: heating of the surface of the object; formation of a plasma around the surface of the object; ablation of material from the object; and even melting of the object's surface. Obviously, the heating or modification of the surface of an object can affect the internal workings and functionality of the object. Specifically, if the outside surface gets too hot, this heat can be conducted into the interior of the object and render it inoperable.

Reflection of electromagnetic radiation is important for many applications. For example, higher levels of reflection can be used to make measurements on an object using directed electromagnetic radiation beams, such as range finding and inertial measurements, considerably more accurate. Also, highly reflective surfaces can be used to protect the surface of an object from any modification or damaging effects that would result if the impinging electromagnetic radiation were to be absorbed into the surface of an object.

Electromagnetic radiation is a self-propagating energy wave in space and/or through matter. Electromagnetic radiation has an electric and a magnetic field component, which oscillate in phase perpendicular to each other and in the direction of the energy propagation. Electromagnetic radiation is generally classified according to the frequency of the waves, including (in order of increasing frequency): radio waves, microwaves, terahertz radiation, infrared radiation, visible light, ultraviolet radiation, etc. Of these, radio waves have the longest wavelengths and the lowest frequency and ultraviolet has the shortest wavelengths and highest frequencies. Electromagnetic radiation carries energy and momentum, which may be imparted to an object when it interacts with the matter of the object. The most familiar form of electromagnetic radiation is light, which has a wavelength between approximately 400 nm and 700 nm.

A commonly used device for generating a directed electromagnetic radiation beam in the visible and infrared spectrums is the laser. A laser is a device that emits electromagnetic radiation through a process called Light Amplification by Stimulated Emission of Radiation (LASER). Electromagnetic radiation from a laser is coherent and nearly monochromatic. As a result of these properties of coherence and monochromaticity, a laser can provide an intense amount of electromagnetic radiation power or energy per unit area to the surface of the object the beam is impinging upon.

FIG. 1 illustrates the use of a directed electromagnetic radiation source, in this case a laser 10, which is a device that emits monochromatic and coherent radiation in the form of a laser beam 11, usually at the optical or infrared frequencies. As shown in FIG. 1, the laser beam 11 is impinging on the surface 14 of an object 12 located some distance 13 away from the laser 10. The laser 10 may be one of several possible types, including: gas; chemical; solid state; excimer; dye; free electron; etc. Importantly, although the source of the electromagnetic radiation shown in FIG. 1 is a laser, the present invention can be applied to any form or source of electromagnetic radiation over very large spectrum of wavelengths ranging from wavelengths shorter than ultra-violet, through the visible, near infrared, long wavelength infrared, terahertz wavelengths, to wavelengths longer than millimeter waves.

The laser and object configuration shown in FIG. 1 can be used to measure the distance 13 between the laser 10 and the object 12. Specifically, FIG. 1 illustrates a laser 10 used as a rangefinder, wherein the most common method of measuring distance is performed by sending a laser beam or pulse in a narrow beam 11 towards the object 12 and measuring the time taken by the laser beam or pulse 11 to propagate or travel the distance 13 from the laser 10 to the object 12, as well as the time taken by the laser beam or pulse 11 to reflect off the surface of the object 12 and propagate the distance 13 back to the laser 10. The total time of flight is divided by two multiplied by the speed of the laser radiation to calculate the distance 13. The high speed of light makes inexpensive rangefinders difficult to implement with high (i.e., sub-millimeter) precision. However, other techniques, such as triangulation or multiple frequency phase shift, can be used to significantly improve precision. Furthermore, with modification, the configuration of FIG. 1 can also be used with Doppler methods to determine the speed of the object, if it is moving, as well the direction of the object. Moreover, more advanced techniques allow the acceleration, as well as the rate of rotation of the object to be determined, as well with a reflected electromagnetic radiation beam.

Irregardless of the complexity and resultant precision of the exact laser 10 rangefinder configuration used, an important criteria for the ability of the laser 10 to measure the distance 13 between the laser 10 and object 12 is the reflectance of the object's 12 surface 14. That is, a more reflective surface allows the laser to determine the distance with a higher level of precision and accuracy and also allows the laser to measure the distance 13 when the separation between the laser 10 and the object 12 is a greater distance 13. Therefore, there is a need to create surfaces for objects with higher levels of reflectance so that the objects can be measured more accurately for distance, speed, direction, acceleration, and rate of rotation, as well as other important parameters that can be measured using reflected electromagnetic radiation.

It is also important to note that, while the electromagnetic radiation shown in FIG. 1 is generated by a laser, the source of electromagnetic radiation could be generated by other types of sources and/or operate over any one of a number of wavelengths within the electromagnetic spectrum ranging from below ultra-violet to the above millimeter wavelengths.

FIG. 2 is an illustration of a laser system 15 mounted on a platform 14 in which a laser beam 16 is directed onto the surface 19 of an object 17 moving in free flight above ground level 18. In this case, the object 17 is moving in free flight, either as a projectile or as a self-propelled system. The laser beam 16 is pointed and aimed at the object 17, possibly to measure its distance, as well as other important inertial parameters, and impinges onto surface 19 of the object 17. Again, for the application of range-finding and inertial measurement, it is important for performance and accuracy that the object 17 be as reflective as possible at the interrogation wavelengths. The laser system 15 may employ a tracking system in order to allow the laser beam 16 to continuously impinge onto the surface 19 of the moving object 17 while it is in free flight. This tracking system could be of any known type, such as radar, optical, etc. In fact, the tracking may be enabled by detecting the intensity of the reflected laser beam and comparing it to the emitted laser beam 16.

Consequently, a reflective surface on macro-scale objects, whether stationary or moving, will be useful for applications where the object's distance and inertial parameters are to be measured and possibly continuously monitored.

Furthermore, there is a need for the ability to prevent an impinging electromagnetic radiation beam from heating the object onto which the beam is impinging. It is well known that the interaction of a laser beam with the surface of the object can cause significant heating to the object's surface, if the power of the laser is sufficiently large. This heating can result in a variety of physical phenomena on and around an object, including: heating of the surface of the object; formation of a plasma around the surface of the object; ablation of the material from the object; and even melting of the object's surface.

For example, at higher laser power levels when the beam impinges on a surface, the material surface of an object is heated by the absorbed laser energy and the surface material can evaporate or sublimate. At even higher laser power levels, the material at the surface and the surrounding medium (i.e., air or rarified gas) can be converted to a plasma. Usually, laser ablation refers to removing material with a pulsed laser, but it is possible to ablate material with a continuous wave laser beam, if the laser intensity is high enough.

In many circumstances, it is desirable that the impinging laser beam result in little or no heating, modification, or damage to the surface of the object, even at moderate to high impinging laser beam power levels. Therefore, there is a need for a method by which an object can reflect most or all of the impinging laser radiation.

SUMMARY OF THE INVENTION

The present invention relates to a method of forming engineered surfaces that can be placed on an object to reflect electromagnetic radiation that is directed at and impinges onto the object. The present invention also relates to a method of preventing or inhibiting the conduction of heat into the interior of an object, which is being impinged upon by an electromagnetic radiation, which is useful when the reflectivity of the surface is not at the maximum value (i.e., 100%).

The basis of the method of the present invention is to create a reflective surface using multiple layers of alternating materials wherein the effective indexes of refraction are varied in a periodic manner. The effective index of refraction of the layers can be varied by: varying the reflective index of the materials; by periodic variation of some physical characteristic of the layers, such as the thickness; by implementing periodic structures within one or more material layers; using photonic crystals; or by a combination of two or more of these methods.

The basis of the method to limit the heat of heat to the interior of an object is to reduce the thermal conduction from the surface of the object to its interior. This can be accomplished by reducing the transport of phonons from the surface of the object to the interior of the object. Phonons transport can be limited by: increasing the thermal resistance of the layer intermediate between the surface of the object and its interior; by creating periodic crystalline structures which result in a bandgap or bandstop for phonons over a certain phonon wavelength band; by micro- or nano-machining one or more intermediate layers between the surface of the object and its interior to reduce thermal conduction; or be a combination of two or more of these methods.

The engineered surfaces can be implemented by a variety of methods in the micro- and nanofabrication, optical coating technology, and/or nanotechnology domains including: Physical Vapor Deposition (PVD); Chemical Vapor Deposition (CVD); Reactive Ion Etching (RIE); wet etching; Plasma Spray Deposition (PSD); Thermal Spray Coatings (TSC); as well as others.

BRIEF DESCRIPTION OF THE DRAWINGS

FIGS. 3(a) and (b) are illustrations of, respectively, a laser impinging on a non-reflective object and on a reflective object that is made reflective by a surface coating of a metal.

DETAILED DESCRIPTION OF THE INVENTION

Figure 1:
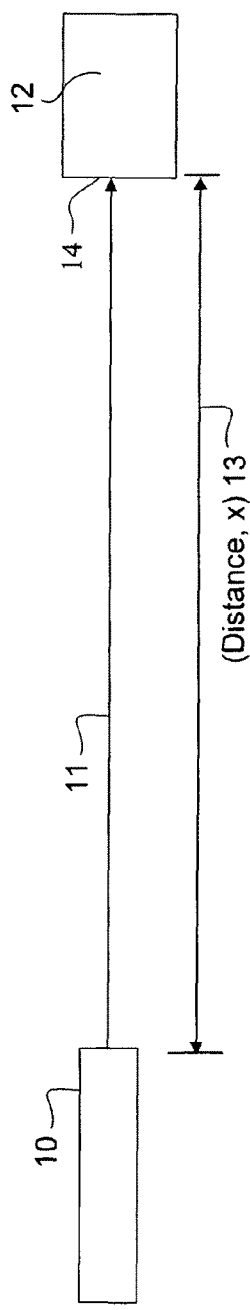
FIG. 1 is an illustration of a laser impinging on an object
Figure 2:
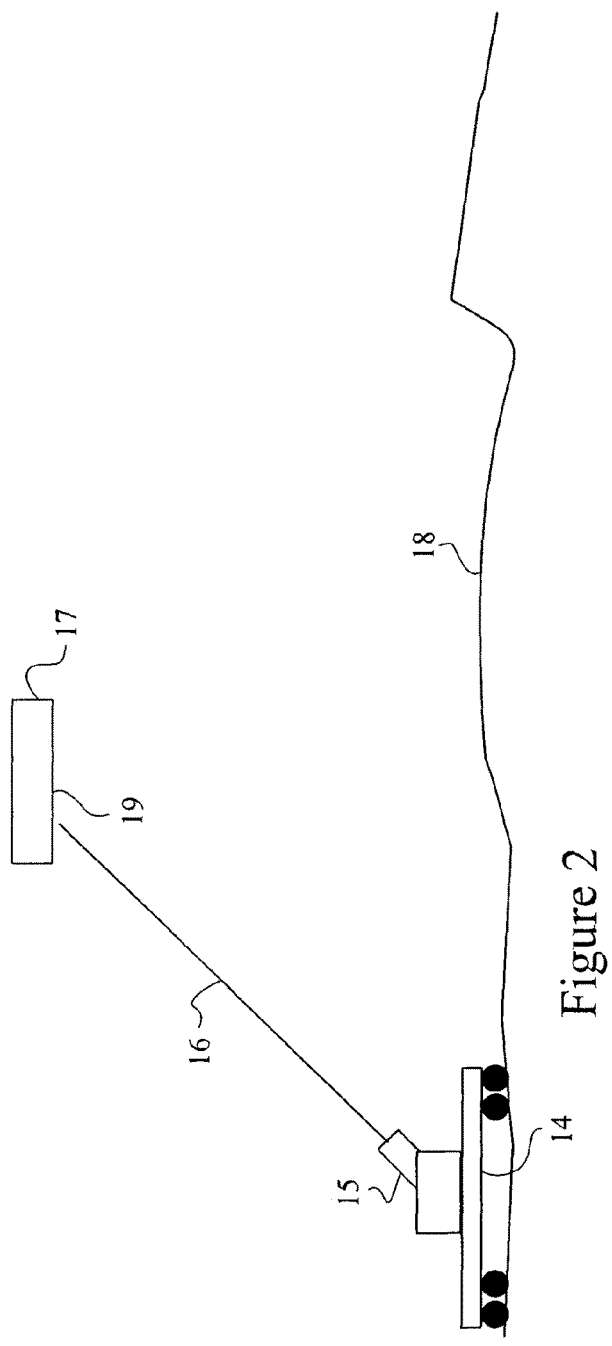
FIG. 2 is an illustration of a laser system impinging on a moving object.

The present invention relates generally to engineered surfaces that are fabricated into or applied onto the surfaces of macro-scale objects and implemented so as to reflect impinging electromagnetic radiation, as well as limit heating within the interior of an object upon which electromagnetic radiation impinges. The present invention is also directed at methods to limit the amount of heat conducted into the interior of the object, especially when the reflectivity of the engineered surfaces on the exterior of the object is less than 100%.

The engineered surfaces can also be created so as to reflect over a broad band of wavelengths of the electromagnetic source, including near ultra-violet, visible, near infrared, long wavelength infrared, terahertz and millimeter waves.

Electromagnetic radiation can be reflected from a macro-scale object by using the method of the present invention. Specifically, the method involves reflecting the electromagnetic radiation impinging on the surface of an object by coating the object with a mirror-like substance. For example, an object coated with gold or silver or a similar metal substance will reflect optical electromagnetic radiation that impinges on the surface over a certain range of wavelengths in the electromagnetic spectrum.

This method is illustrated in FIGS. 3(a) to (c), wherein in FIG. 3(a), a laser 10 emits electromagnetic radiation in the form of a directed beam 11, such that it impinges onto the object's surface 14. The surface 14 of the object 12 is not very reflective at the wavelength of the impinging laser beam 11 generated by laser 10, and as a result, the reflected beam 16 is very weak in intensity, thereby making any measurement of distance 13, or other inertial parameters of the target object 12 difficult or impossible. However, in FIG. 3(b), the surface 14 of the target object 12 is now coated with a metal layer 15 that is reflective at the wavelength of the impinging laser beam 11, and as a result, the reflected beam 16 is very strong in intensity, thereby making any measurement of the distance 13, or other inertial parameters, much less challenging. The reflective metal film 15 on the surface 14 of the object 12 does not allow the electromagnetic radiation in the form of a laser beam 11 to penetrate into the layer of the coating 15 on the surface 14. Although this method will provide for excellent reflection properties, it can be costly for larger objects 12, since the types of metal materials that are most reflective and reflective over the broadest range of wavelengths are of the types of noble or precious metals, such as gold and silver. Moreover, most noble metals, such as gold and silver, are extremely ductile and malleable, and therefore, may be too soft for a surface coating 15 on a macro-scale object 12 that may be undergoing high speed air flights or even normal handling.

Figure 4:
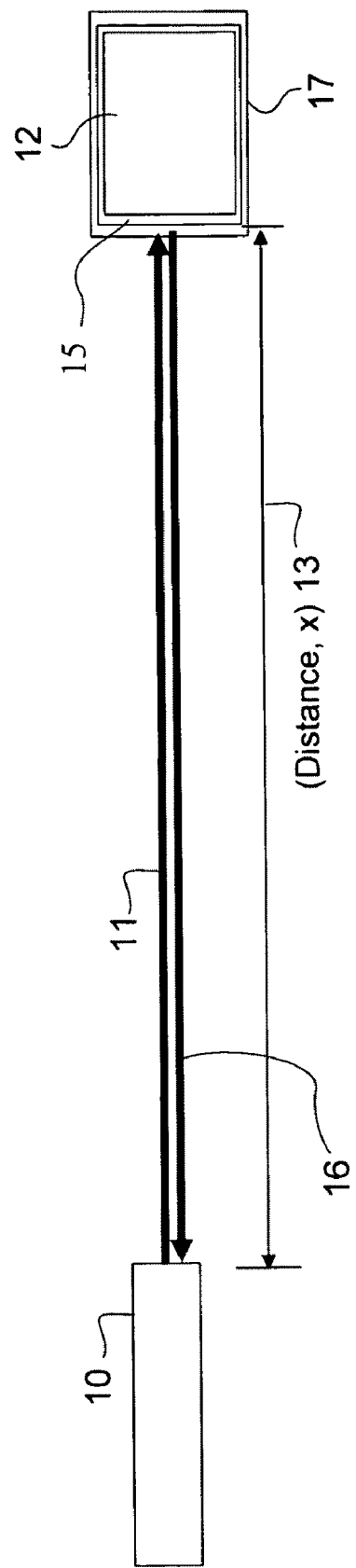
FIG. 4 is an illustration of a laser impinging on an reflective object that is made reflective by a surface coating of a metal having a thin layer protective coating over the reflective metal layer.

A slight modification of the arrangement shown in FIG. 3(b) is shown in FIG. 4, which depicts a method of protecting the metal coating 15 from wear-and-tear, as well as other damaging effects from handling and flight, in which the metal surface layer 15 is coated with a thin durable material layer 17 that is transparent in the electromagnetic radiation wavelengths that are desired to be reflected, as illustrated in FIG. 4.

Another method to reflect electromagnetic radiation from a macro-scale object is to place or deposit multiple thin film layers on the surface of the object. That is, a stack of thin film layers having alternating indices of refraction with predetermined values and manufactured with predetermined thicknesses can reflect impinging electromagnetic radiation with high reflectivity. The reflectivity of a stack of thin-film layers having alternating indices of refraction, wherein the thicknesses of the films are a fraction of a wavelength can be obtained by analyzing the radiation as it impinges and interacts with these layers as wave packets. A wave packet propagating through a film stack experiences multiple reflections at the interfaces between the layers and these reflected packets interfere with each other. If the thicknesses and the refractive indices of the material layers are selected properly to produce constructive interference at a particular wavelength, nearly 100% reflectance of the wave packets from the surface of the film stack will occur at that wavelength. A stack of material layers with alternating indices of refraction of this type has been known in optics and photonics and is commonly referred to as a Bragg reflector. However, it has only been used on small devices, lenses and similar types of elements, and not on macro-scale-sized objects. The thin film layers in the stack can be composed of a wide variety of different materials and materials, such as oxides and ceramics. As a result, the types of materials used in these reflective surfaces are more suited to withstand handling and abrasive effects, as compared to the metal reflective surface described above.

Figure 5:
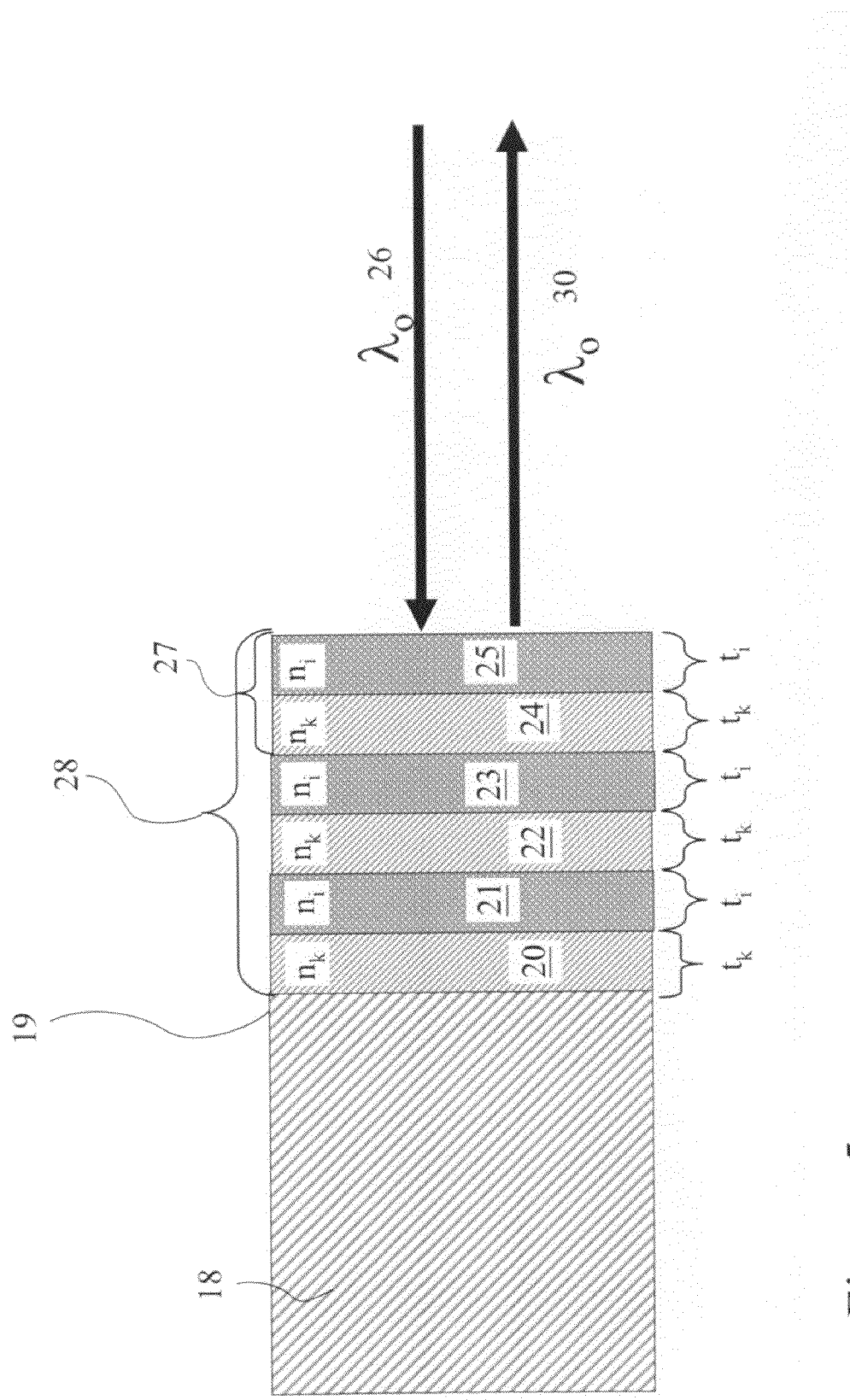
FIG. 5 is an illustration of a reflector made by depositing predetermined thin films layers of materials having alternating indices of refraction, nk and ni, and thicknesses, tk and ti.

FIG. 5 illustrates a multiple layer reflector configuration 28 that is tailored to reflect electromagnetic radiation at a single "resonant" wavelength $\lambda_o$ 26. The embodiment of the invention shown in FIG. 5 includes three pairs of thin film layers 27 forming configuration 28. A "layer pair" 27 consists of a pair of layers, one of lower refractive index $n_k$ (i.e., layers 20, 22, and 24) and the other of higher refractive index $n_i$ (i.e., layers 21, 23, and 25). The thickness of each lower index of refraction material (forming layers 20, 22, and 24), as well as the thickness of each higher index of refraction material (forming layers 21, 23 and 25) is selected to satisfy the equation:

$$n_k t_k = n_i t_i = \lambda_o/4 \qquad \text{Equation 1}$$

This condition means that the optical thickness (product of refractive index and physical thickness) of each layer (20, 21, 22, 23, 24, and 25), whether of high index or low index material, is a quarter wave at the resonant wavelength 26, that is, the wavelength of the electromagnetic radiation 26 that is intended to be reflected. The configuration shown in FIG. 5 is composed of a number of such layer pairs 27. The normal-incidence reflectivity at the resonant wavelength 26 increases with the number of layer pairs 27 in the configuration 28. That is, the reflectance of a stack of five layers 27 would be higher than the reflectance of a stack composed of only three such layers 27. The schematic of FIG. 5 shows a configuration containing three such layer pairs 27, but with a sufficiently large number of layers 27, say 5 to 10 or more, the reflectance at the resonant wavelength $\lambda_o$ 26 will be nearly 100%.

Figure 6:
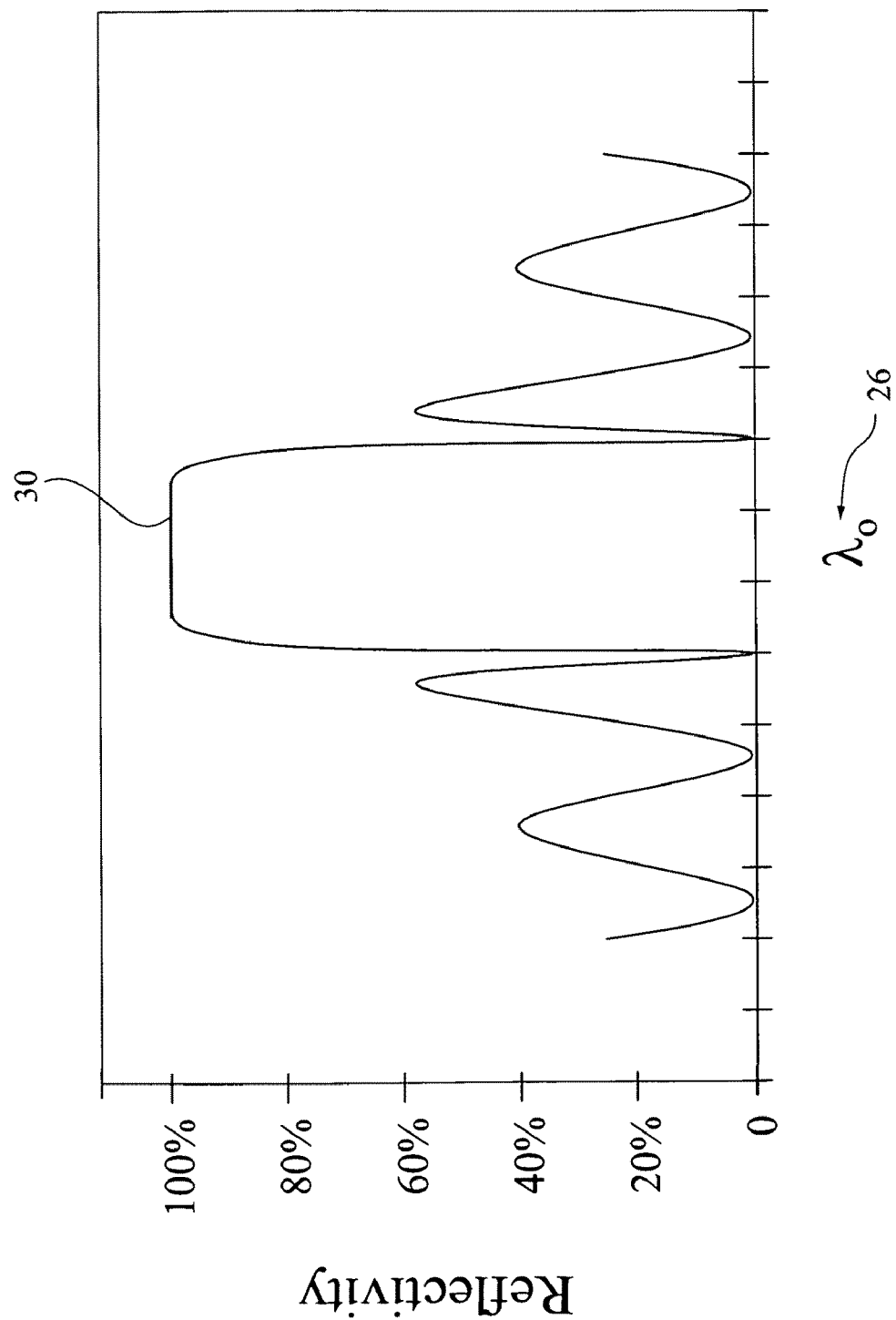
FIG. 6 is a graph showing reflectivity of a multiple layer stack shown as a function of the wavelength λo, with the stack being 100% reflective over a small range of wavelengths.

FIG. 6 illustrates the reflectivity 30 of such a multiple layer 27 stack 28 as a function of wavelength 26, wherein it can be seen that the reflectance 30 of the layers 27 is 100% over a small range of wavelengths centered near wavelength $\lambda_o$ 26.

The multiple layered pair 27 stack 28 shown in FIG. 5 can be applied over the entire surface of a macro-scale object 18, or only over a partial area of the surface of the macro-scale object, depending on the application. For example, for remotely measuring range or inertial parameters of any object 18 using directed and reflected electromagnetic radiation, it may be desirable to apply the multiple layered pair 27 stack 28 over a small area where the measurements are to be taken with the laser. However, for applications where it is desired to protect the entire surface of the macro-scale object 18 from any damaging effects of a directed electromagnetic radiation beam, it may be more desirable to apply these layers over the entire exposed surfaces. The extent of the use of these layers can vary from a small area of a macro-scale object to the entire area and will be determined by the application.

While the configuration shown in FIG. 5 can have a large overall value of reflectance, if there are several or more layered pairs 27 in the stack 28 and the indices of refraction of the alternating layered pairs 27 are sufficiently different from one another, this configuration is reflective only over a very narrow band of wavelengths and will not efficiently reflect over a wide spectral band width of wavelengths. This is because a multiple layered pair reflector is designed to efficiently reflect monochromatic radiation propagating in a particular direction (e.g., a laser beam). However, the wavelength of the electromagnetic radiation source impinging the object may be any specific wavelength range over a wide spectrum of wavelengths (i.e., over a band of wavelengths). Therefore, the multiple layer reflector may or may not be effective as a reflector at the specific wavelength of the impinging electromagnetic radiation beam if the reflective layers were not designed so as to be reflective at that wavelength, again according to the equation above. Furthermore, it may be possible to have the impinging electromagnetic radiation be multi-spectral, that is, the impinging electromagnetic radiation may be composed of a band of wavelengths rather than a specific wavelength. Therefore, the multiple layer reflector designed or tuned to be reflective over a specific narrow range of wavelengths will not be reflective at wavelengths outside of this range. Additionally, as a high energy electromagnetic radiation beam impinges on the surface of an object, the reflected radiation from the surface of the object will impinge onto air or gas molecules surrounding the object, with the result that the surrounding air or gas medium may become ionized and consequently emit over a range of wavelengths, thereby requiring a effective reflective surface coating to reflect over a wide spectral band width. Furthermore, the impinging radiation may have an incident angle over a large range of values and it is desired that any reflector effectively reflect incident radiation from all possible incident angles.

Therefore, because of the above-mentioned reasons there are applications requiring a reflective coating on a surface of an object where the coating can be reflective over a broad range of wavelengths and angles of incidence. Making a multiple layer reflector that can efficiently and effectively reflect over a large spectral bandwidth and over all possible incident angels is more complex.

The implementation of more than one stack of layered pairs, each of which is tuned to a certain center wavelength, can be used effectively to have a high reflectance over a broader range of wavelengths. Each of the stacks is designed to be resonant or reflective at a different wavelength lying within the intense part of the impinging electromagnetic radiation spectrum. The stacks can be layered over one another, as shown FIG. 7 for a two-stack system wherein each stack is composed of three layered pairs.

Figure 7:
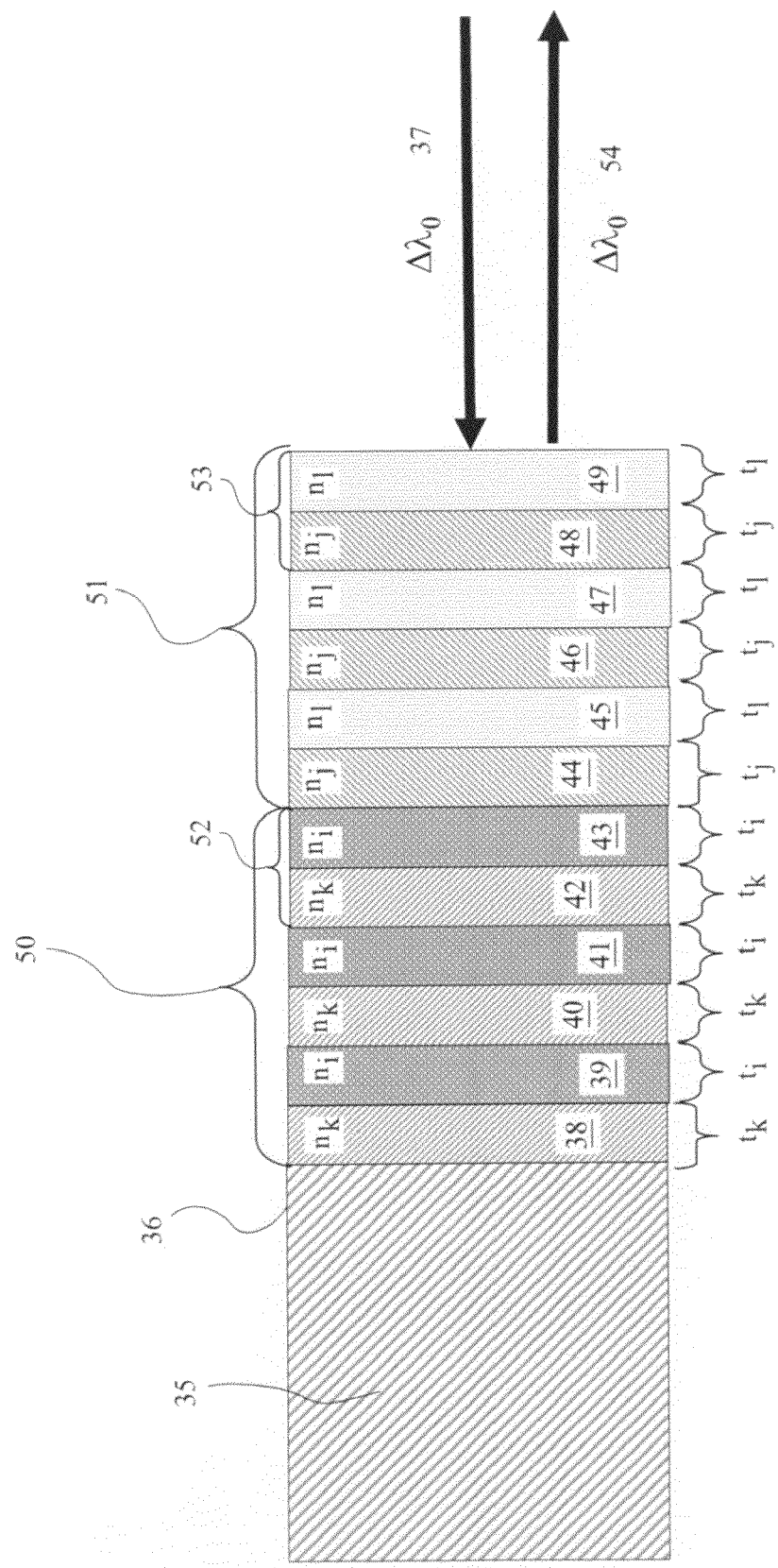
FIG. 7 is an illustration of a reflector made from two stacks of thin film layers, wherein each stack is composed of three pair of layers and each layer pair is composed of alternating layers of thin film materials having predetermined indices of refraction thicknesses.

Referring to FIG. 7, an object 35 has deposited onto its surface 36 a number of thin film layers 38 through 49, as shown. A broadband electromagnetic radiation beam 37 having a wavelength spectrum of $\Delta\lambda$ is incident onto the top surface of the outmost thin film layer 49. Each of the thin film layers 38 through 49 has a thickness $t_k$, $t_i$, $t_j$, or $t_l$ and indices of refraction $n_k$, $n_i$, $n_j$, or $n_l$. As in FIG. 5, a layer pair is composed of two consecutive layers, one having a lower index of refraction and the other having a higher index of refraction. As shown in FIG. 7, there are two stacks 50 and 51, each of which has three pairs 52 or 53 of thin film layers in each stack 50 and 51. Each of the stacks is tuned to reflect at a specific wavelength by alternating layers with low and high index of refraction materials. The first stack 50 alternates layers of materials with a low and high index of refraction 38 and 39, 40 and 41, or 43 and 44, having indices of $n_k$ and $n_i$ and thicknesses of $t_k$ and $t_i$. The second stack 51 also alternates layers of materials with a low and high index of refraction 44 and 45, 46 and 47, or 48 and 49, having indices of $n_j$ and $n_l$ and thicknesses of $t_j$ and $t_l$. The combined effect of the stacks on top of one another is to reflect over a broader band than would be possible with either of the stacks alone. Importantly, the thicknesses and indices must satisfy the Equation 1 above for a given incident wavelength $\lambda_o$ 37 to be reflected 54, as shown in FIG. 7.

As in the configuration of a single stack as shown in FIG. 5, adding more layer pairs or having material layer pairs wherein the materials have widely differing indices of refraction allows the reflectivity to be increased as compared to a stack having less layer pairs or having material layer pairs wherein the materials have indices of refraction close in value. Also, more than two stacks of layered pairs can be combined to accomplish the objective of broadening the band of wavelengths $\Delta\lambda$ that are reflected 54 from the multiple layer pairs 52 and 53. The number of layered pairs 52 and 53 used in each stack 50 and 51, respectively, and the number of stacks 50 and 51 in the surface layers is determined based on the application and the value of reflectivity desired, as well as the band width of impinging electromagnetic radiation to be reflected 54. Additionally, it is understood that these layered pairs may be applied over the entire surface of a macro-scale object 35 or only over a part of the surface depending on the application.

Figure 8:
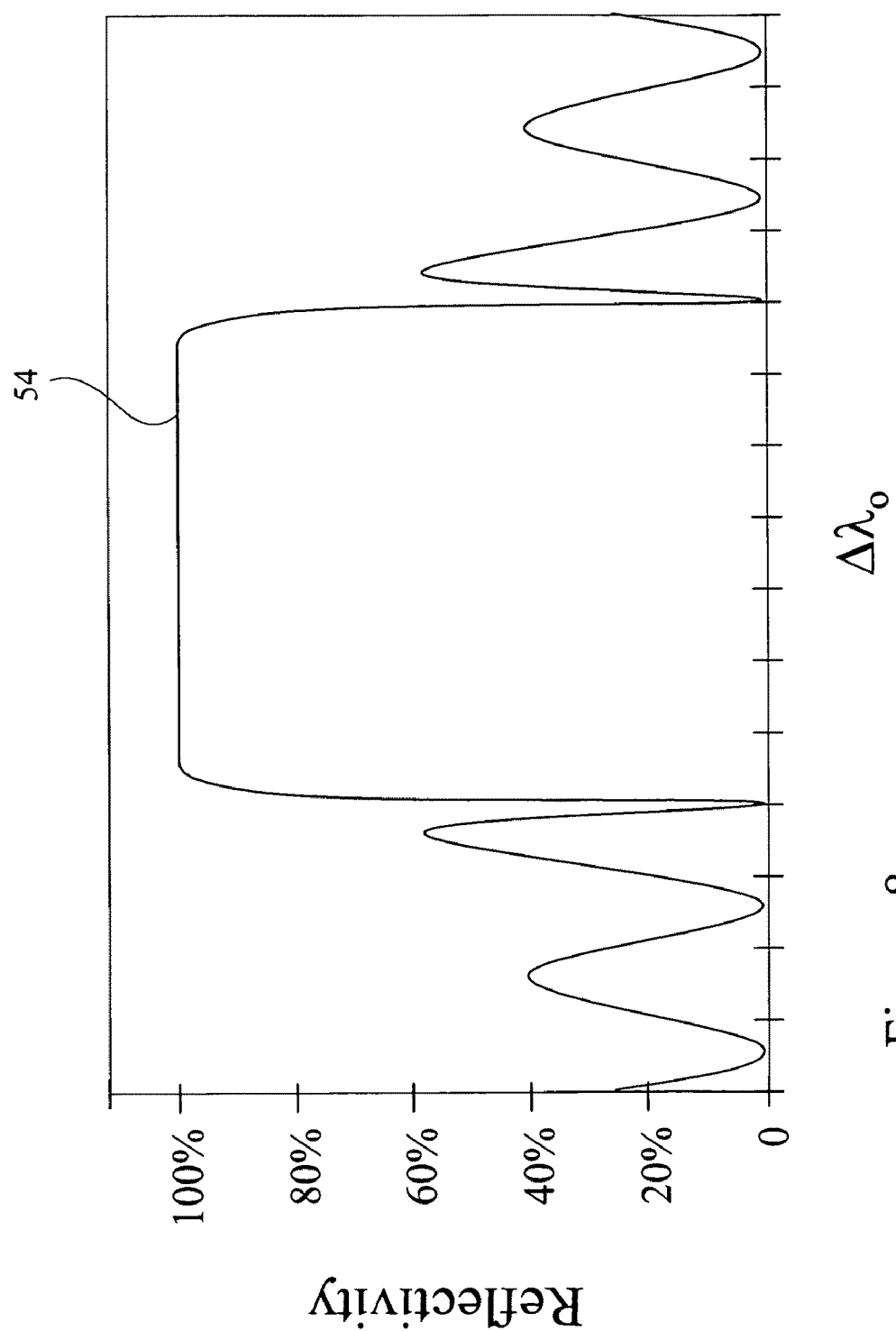
FIG. 8 is a graph showing reflectivity as a function of the wavelength of a number of multiple layer paired stacks, with the stack being 100% reflective over a large range of wavelengths λΔ.

FIG. 8 illustrates the reflectivity 54 of multiple stacks 50 and 51 with multiple layers 52 and 53 as a function of wavelengths 37, wherein it can be seen that the reflectance 54 of the stacks 50, 51 and layers 52 and 53 is 100% over a wide range of wavelengths centered near wavelength $\Delta\lambda$ 54.

The multiple layer reflective surfaces can be deposited by a variety of methods known in the art and commonly used in the micro- and nanofabrication, optical coating technology, and/or nanotechnology domains including: Physical Vapor Deposition (PVD); Evaporative Deposition; Electron Beam Physical Vapor Deposition; Sputter Deposition; Cathodic Arc Deposition; Pulsed Laser Deposition; Chemical Vapor Deposition (CVD); Plasma Spray Deposition (PSD); Thermal Spray Coatings (TSC); as well as others. Additionally, a wide variety of different materials can be used as layers in these multiple layer stacks, including oxides, ceramics, dielectrics and metallo-dielectrics. The important criteria for materials and deposition methods for a given application include: the indices of refraction of the materials at the wavelength(s) for which it is desired that the stack be reflective; the thickness control and uniformity control of the material and deposition method (particularly over large areas if the object to be made reflective is large in size); the stability and robustness of the deposited film materials; cost; environmental and safety hazards; adhesion of deposited layers on the surface materials that the layers are deposited onto; and stress of the deposited layers on other material surfaces of the objects to be made reflective.

Reflective surfaces can also be implemented on objects using photonic crystals or diffraction gratings. Photonic crystals are composed of periodic nanostructures that affect the propagation of electromagnetic radiation in the same way as the periodic potential in a semiconductor crystal affects the electron motion by defining allowed and forbidden electronics energy bands. Essentially, photonic crystals contain regularly repeating internal regions of high and low dielectric constant made by fabricating periodic structures in dielectrics and/or metallo-dielectrics.

Any photons will propagate or not propagate through a photonics crystal, depending on their wavelength. Wavelengths allowed to propagate through structure are termed modes and groups of modes form wavelength bands. Wavelengths within a band that does not propagate are called disallowed bands or photonic band gaps. This effect is used to implement high-reflectance mirrors that can be used on the surface of an object. The implementation of a photonic crystal on a surface reflector requires that periodic diffractive elements be fabricated into the engineered surfaces. These periodic elements are on the dimensional scale of half the wavelength of the electromagnetic radiation to be reflected. These elements can be made using micro- and nanofabrication techniques, such as photolithography, reactive ion etching, ion milling, chemical vapor deposition, wet etching, etc.

Similarly, diffraction gratings are structures with a periodic pattern that diffract or split the impinging electromagnetic radiation into several beams having direct directions. The directions of the beams depend on the dimensional spacing of the grating as well as the wavelength of the electromagnetic radiation. Specifically, if the diffraction grating has a periodic spacing between the reflective elements in the grating at a particular wavelength to result in the reflected beams to constructively interfere with one another, the intensity of the reflected electromagnetic radiation from the diffraction grating will be quite high (i.e., near 100%). However, diffraction gratings will only be maximally reflective at a certain angles of incidence.

While 100% reflectance at a single or over a wide band width of electromagnetic wavelengths is desirable, this may be difficult to implement. Therefore, if the reflectance of the surface of an object is less than 100%, the surface will experience some level of heating, if the impinging electromagnetic radiation intensity is sufficiently high. Therefore, there is a need for a method by which any absorbed radiation that impinged onto the surface of an object does not result in significant heating of the interior of the object.

Heat transfer is typically divided into three modes of transport: conduction, convection, and radiation. Heat transport problems are solved using the conservation laws of energy, mass and momentum combined with constitutive equations that relate heat flux to temperature differentials through material properties or constants of nature. Two important equations for solving heat problems are Fourier's law of heat conduction where the heat flux is equal to the negative product of the thermal conductivity and the thermal gradient, and Stefan-Boltzmann law for blackbody radiation, where the total energy radiation per unit surface area of a black body in unit time is equal to the fourth power of the black body's thermodynamic temperature and a proportionality constant called the Stefan-Boltzmann constant given by $5.67 \times 10^{-8}$ $W/m^2K^4$.

In order for thermal energy to be transported, there must be carriers of the energy. These carriers of energy may be one or more of the following: electrons, phonons, photons, or molecules. In the case of the most macro-scale objects, heat transport is limited predominantly to phonons (through thermal conduction); photons (through thermal radiation); and molecules (through thermal convection from a fluid stream to the object surfaces). The issue is how to reduce these thermal transport mechanisms in the configuration of the interior of an object. With a radical reduction in heat transport, the exterior of the object can be increased to relatively high temperatures, while allowing the temperature within the interior of the object to be only slightly elevated. Several methods to reduce heat transport to the interior will be reviewed.

It is recognized that the primary source of heat transport in the circumstance of an object being impinged by electromagnetic radiation will be thermal conduction. Thermal conduction is primarily heat transport through the materials of the object itself. In general, thermal conductance is directly proportional to the thermal conductivity of the materials through which the heat flux passes, directly proportional to the cross sectional area orthogonal to the heat flux, and inversely proportional to the length of material through which the heat flux passes. Therefore, thermal conduction can be reduced is several ways. One approach is to reduce the thermal conductivity of the materials used. For example, Zirconia has a thermal conductivity of about 2 W/m K which makes it relatively low as compared to many other materials, such as metals and metal alloys. Other suitable materials would be aerogels, as well as the materials used in tiles on the United States Space Shuttle which have a thermal conductivity of 0.126 W/m K at 2000° F.

However, materials having low values of thermal conductance are not suitable for the multiple layered pairs from which to make reflective coatings.

Figure 9A:
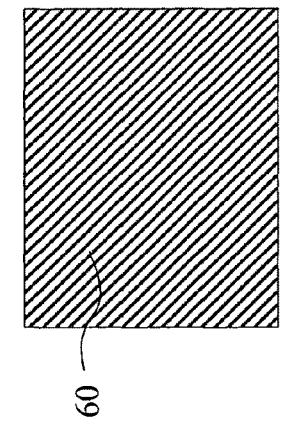
FIGS. 9(a) to (c) illustrate a method of depositing an insulating layer underneath the reflecting surface fabricated by deposition of multiple thin film layers.
Figure 9B:
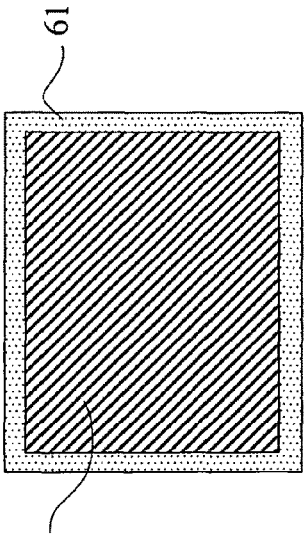
Figure 9C:
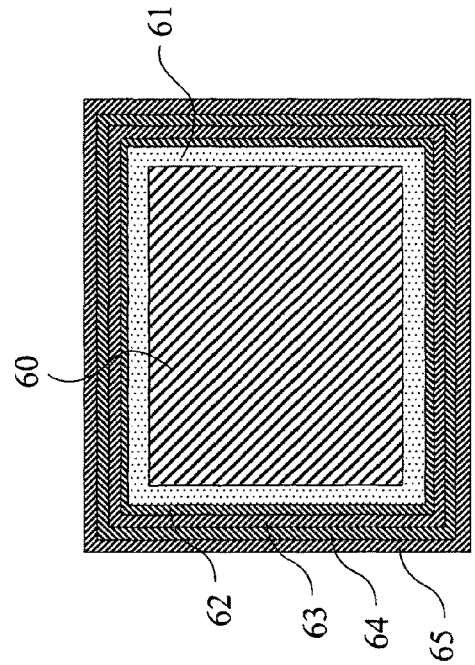

An alternative configuration to reduce thermal conduction would be to coat the surface of a macro-scale object with an insulating material having a low thermal conductivity before the multiple layered pairs are applied to make the surface reflective. An object 60 that is to be protected from electromagnetic radiation is shown in FIG. 9(a). The object 60 is coated with a layer of material 61 that has a low value of thermal conductance, as shown in FIG. 9(b). The thickness of the layer 61 will depend on the thermal conductivity of the material from which layer 61 is made, as well as the maximum acceptable temperature that object 60 can reach. Subsequently, as shown in FIG. 9(c), multiple layer pairs, 62, 63, 64 and 65 are deposited according to the criteria described above to create a reflective surface on top of the insulating layer 61 on the surface of the object 60. Although the number of layered pairs shown in FIG. 9(c) is only 2, any number of pairs can be implemented to obtain the desired value of reflection. Additionally, multiple layered pair stacks can be implemented as well in order to obtain a surface on the object 60 that has a high reflection over a wide bandwidth of wavelengths of impinging electromagnetic radiation. Furthermore, the thickness of the insulating layer 61 can be adjusted in the implementation to obtain the desired reduction in thermal transport through the layer 61 and to the object 60.

The insulating layer can be deposited using a number of different techniques including: Physical Vapor Deposition (PVD); Evaporative Deposition; Electron Beam Physical Vapor Deposition; Sputter Deposition; Cathodic Arc Deposition; Pulsed Laser Deposition; Chemical Vapor Deposition (CVD); Spray Coating; Dipping; Plasma Spray Deposition (PSD); Thermal Spray Coatings (TSC); as well as others.

Using micro-fabrication technology it is possible to create very high levels of thermal isolation. In fact, a reduction of thermal conduction of 30 to 50% or more is possible using micro- or nanofabrication implementation techniques. This level of thermal isolation would allow the exterior temperature of an object to be increased by a significant amount without much heat propagating into the interior of the object. The basic approach for achieving high thermal isolation is illustrated in the FIG. 10.

Figure 10:
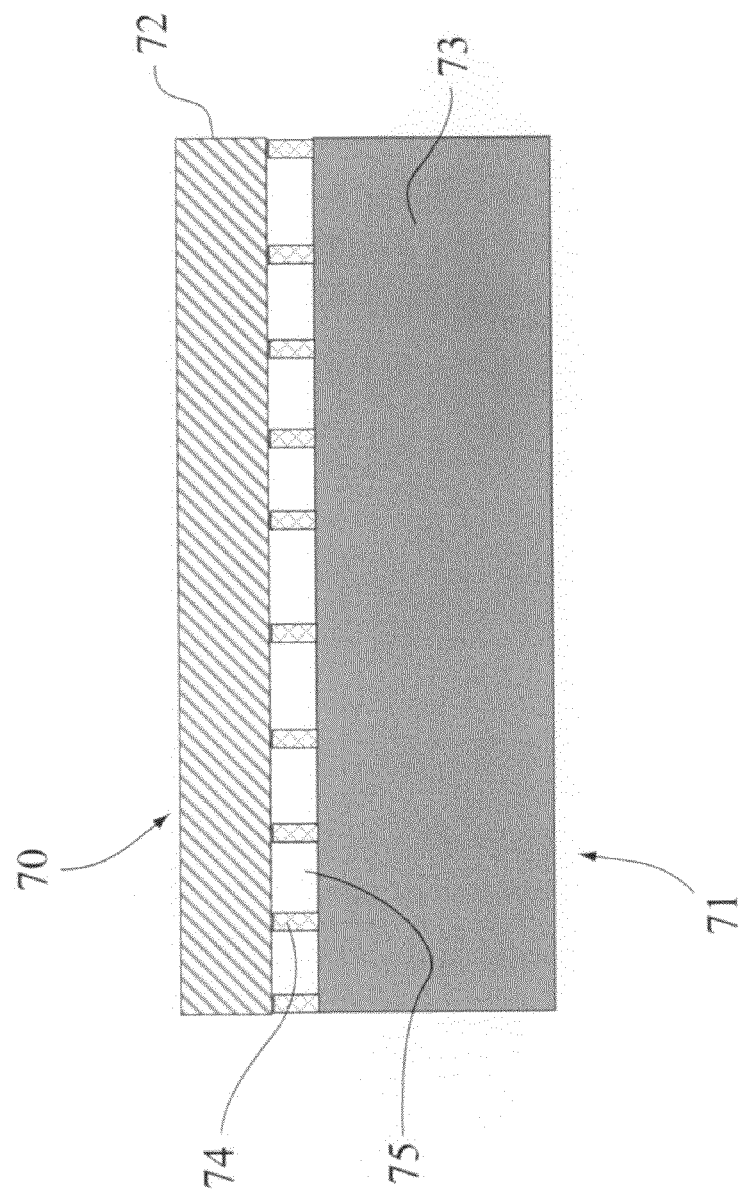
FIG. 10 is a cross-sectional illustration of the interior layer of an object in which thermal conduction is reduced using micro-machined layers.

As shown in FIG. 10, which is a cross-sectional illustration of an engineered surface layer, there is an interior layer 73 of an object that has on its top surface a voided material layer 75 with an exterior layer 72 implemented on top and supported by thermal isolation posts or structures 74. The top surface of the high temperature side 70 of the structure is exposed to the heat flux while the low temperature side of the structure 71 is thermally in contact with the object. The voids can be made of air, gas or vacuum or filled with a low thermally conductivity material such as an aerogel. The structure shown in FIG. 10 can be implemented on the surface of an object by deposition of a layer of structural material, followed by patterning and etching this layer to reduce the area through which heat is conducted so that a series of open areas of voids 75 are created. Subsequently, a capping layer of exterior layer 72 material is affixed or bonded onto the thermal isolation posts or structures 74. Alternatively, the voids can be made into the topmost surface of the object rather than depositing a separate layer for this purpose. Using micro-fabrication techniques, a reduction in the area of 30 to 50% or more is possible without a significant degradation in the strength of the surface layers performing micromachining to create voids 75 in the layers combined with additional micromachining on the layers to create strengthening ridges embedded within the structure itself.

Alternatively, the voided regions created in the layer would be refilled with a material having lower thermal conductivity so as to provide for easier and less costly fabrication. Typically, low thermal conductance materials are not very mechanically strong and therefore this approach may have merits over that of just using a low conductivity coating layer as described above.

Another important mode of thermal conduction in the coating layers of the object is through phonon transport. It is well known in thin films that phonons are a significant mechanism of heat transport in solid-state materials. Furthermore, it is also known that phonons can undergo significant scattering in "engineered thin films" as compared to the same material in bulk form, which is manifested as a significant reduction in thermal conductance. Thermal conduction in ceramic materials is both a phonon and photon phenomenon dependent on various factors, including materials structure, operating environment and temperature. Phonon conductivity is determined by mean free path that is approximated to be the lattice spacing. Lattice defects such as voids or dopants will reduce mean free path and frequency of oscillation thereby reducing phonon associated thermal transport. Similarly, photon absorption occurs at interfaces either at the materials boundaries, or at atomic sites in materials that permit photon transport.

There are four approaches for reducing thermal conductivity. The first is by adding multi components as dopants in the basic composition of that layer to reduce the thermal conductivity. A reduction of up to 50% or more is possible with this technique. This reduction in thermal conductivity is because of presence of 5-100 nm defect clusters distributed throughout the material layer.

The second approach is to form short-range alternate layers of high- and low-density structures in monolithic materials i.e., modulated microstructure with periodic density variation resulted in 30-40% reduction in thermal conductivity (without changing the basic composition of layer).

The third approach is changing the microstructure of the coating from columnar growth to zigzag growth, since the thermal conductivity of a coating material is strongly influenced by volume fraction and morphology of porosity present. By controlling the evaporation rate, the deposition temperature and the vapor incidence angle the morphology of the growing coating can be dynamically controlled. A periodic change in vapor incidence angle during deposition will result in planar zigzag morphology. The thermal conductivity of a layer can be reduced by up to 50% or more by controlling the porosity and the thickness of each zigzag layer. By rotating the sample during deposition, helical structures would grow instead of zigzags. The thickness of the zigzag or the helical pitch will be determined by the sample rotation variables.

Lastly, by incorporating additional gas into the material layer during deposition can allow the thermal conductivity to be reduced from the bulk value of the same material by up to 50% or more.

Combining these methods, including reducing the thermal conductance of the layer by micromachining the layer, reducing the thermal conductivity of the layers by making structures that disrupt phonon transport, and reflecting most of the impinging electromagnetic radiation power by creating a multiple layer reflector tuned to the impinging radiation, allows an object to reflect most or all of the impinging radiation and to prevent heating within the interior of any object from any of the impinging radiation that is not reflected from the surfaces. This is shown in FIG. 11 wherein the engineered surfaces are composed of an underlying layer that reduces thermal conduction and an overlying layer which is composed of a multiple layer stack that reflects most, of not all, of the impinging electromagnetic radiation.

Figure 11:
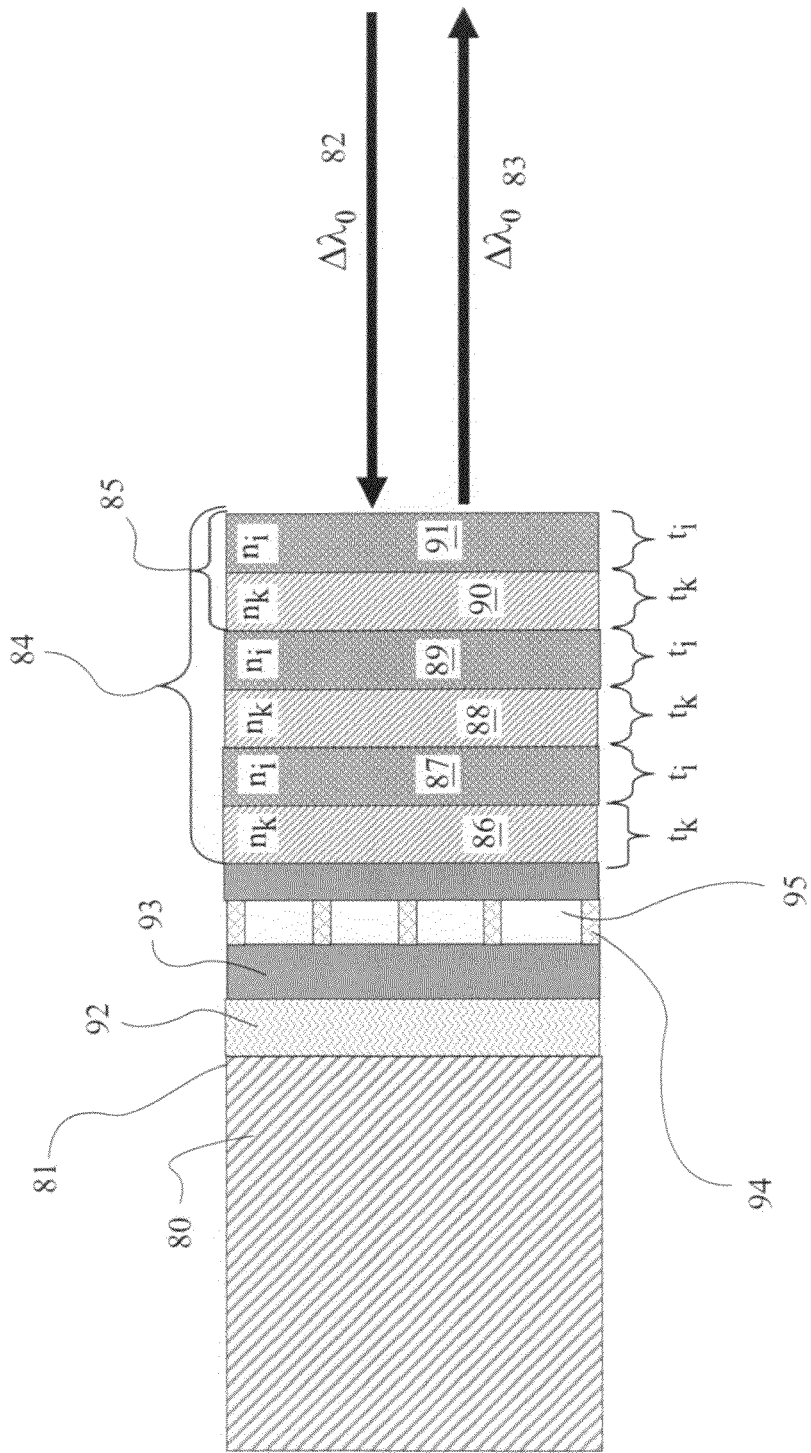
FIG. 11 is an illustration of an object employing multiple layered pairs and stacks to reflect most impinging electromagnetic radiation and also employing micro-machined interior layers to reduce thermal transport into the interior from any absorbed electromagnetic radiation.

As shown in FIG. 11, electromagnetic radiation 82 having a wide bandwidth of wavelengths impinges onto the top surface of an object 80. Object 80 has a surface 81 that is coated by a material layer 92 that disrupts phonon transport employing the techniques described above. On top of material layer 92 is located another material layer 93 that is engineered and machined so as to create thermal isolation posts 94 and voided areas 95. The voided areas may be filled with air or a gas or may be at vacuum or they may be filled with a thermally insulating material. On top of the material layer 93 are located three pairs of thin film layers 84 wherein each pair of layers 85 is composed of alternating layers of a high index of refraction material and a low index of refraction material. Specifically, a "layer pair" 85 consists of a pair of layers, one of lower refractive index $n_k$ (86, 88, and 90) and the other of higher refractive index $n_i$ (87, 89, and 91). The thickness of each lower (86, 88 and 90) index of refraction material as well as the thickness of each higher (87, 89, and 91) index of refraction materials is selected to satisfy Equation 1 given above. This condition means that the optical thickness (product of refractive index and physical thickness) of each layer (86, 87, 88, 89, 90, and 91), whether of high index or low index material, is a quarter wave at the resonant wavelength 82, that is, the wavelength of the electromagnetic radiation 82 that is intended to be reflected 83. The configuration shown in FIG. 11 is composed of a number of such layer pairs 84. As described above, the reflectivity at the wavelength 83 increases with the number of layer pairs 85 in the configuration. That is, the reflectance of a stack of five layers 85 would be higher than the reflectance of a stack composed of only three such layers 85. The schematic of FIG. 11 shows a configuration containing three such layer pairs 85. Additionally, if it is desired to reflect over a wide bandwidth of wave lengths, multiple stack of layered pairs can be employed as described above.

Also, while the configuration shown in FIG. 11 is most general, it is understood that alternative configurations can be implemented depending on the application. For example, it may be desired to include material layer 92 and the multiple layered pairs and stacks, but not the material layer 93. Alternately, it may be desired to include material layer 93 and the multiple layered pairs and stacks, but not the material layer 92.

It is also understood that the material layers 92 and 93 as well as the multiple layered pairs can be deposited and fabricated directly onto the surface of an object 80. Alternatively, these layers may be deposited and fabricated onto tiles which are then placed, bonded, and affixed onto the object 80.

While the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of reflecting electromagnetic radiation impinging on an object and thereby limiting heating within the interior of the object upon which the electromagnetic radiation is impinging, the method comprising the step of:
forming on the surface of the object a plurality of layers of alternating materials, which form a plurality of stacks,
each stack including a plurality of layered pairs of alternating materials, each layered pair of alternating materials in the stack including a first layer of a refraction material having a lower refractive index and a second layer of another refraction material having a higher refractive index,
each of the stack's layers of lower index refraction material having a same, first thickness that is different from each other stack's lower index refraction material's thickness,
each of the stack's layers of higher index refraction material having a same, second thickness that is different from each other stack's higher index refraction material's thickness,
the thicknesses of each layer of the stack's lower index refraction material and each layer of the stack's higher index refraction material being selected so that the stack is tuned to reflect electromagnetic radiation at a predetermined resonant wavelength that is different from each other stack's predetermined resonant wavelength,
the plurality of layered stacks, together, being reflective over a range of electromagnetic radiation wavelengths.

2. The method of claim 1, wherein the effective indexes of refraction of the plurality of stacks are varied by varying the refractive indexes of the layers of alternating materials forming the stacks.

3. The method of claim 1, wherein the effective indexes of refraction of the plurality of stacks are varied by periodically varying a physical characteristic of the layers of alternating materials forming the stacks.

4. The method of claim 3, wherein the varied physical characteristic of the layers of alternating materials is the thickness of at least one of the material layers.

5. The method of claim 3, wherein the varied physical characteristic of the layers of alternating materials is the implementation of periodic structures within at least one of the material layers.

6. The method of claim 3, wherein the varied physical characteristic of the plurality of the layers is the presence of photonic crystals within at least one of the material layers.

7. The method of claim 1, wherein the object is a macro-scale object, and wherein the plurality of layers of alternating materials forming the plurality of stacks is a plurality of thin film layers placed or deposited on at least a portion of the surface of the macro-scale object, the plurality of stacks formed by the plurality of thin film layers being reflective over a range of wavelengths of the impinging electromagnetic radiation.

8. The method of claim 7, wherein the plurality of thin film layers forming the plurality of stacks have alternating indices of refraction with predetermined values and manufactured with predetermined thicknesses so as to reflect impinging electromagnetic radiation with high reflectivity over a predetermined range of wavelengths.

9. The method of claim 8, wherein the radiation's interaction with the stacks of thin film layers as it impinges on the stacks of thin film layers is analyzed as wave packets so as to allow the thicknesses and the refractive indices of the stack's layered materials to be selected to produce constructive interference at the predetermined range of wavelengths, whereby nearly 100% the wave packets are reflected from the surface of the stacks of thin film layers over said predetermined range of wavelengths.

10. The method of claim 9, wherein the thin film layers are comprised of a variety of different materials, including oxides and ceramics.

11. The method of claim 9, wherein each of the stacks of thin film layers is comprised of a plurality of pairs of thin film layers.

12. The method of claim 11, wherein each pair of thin film layers in the stack consists of a layer of a refraction material having a lower refractive index $n_k$ and a another layer of another refraction material having a higher refractive index $n_i$, where $n_k$ and $n_i$ are different for each of the plurality of stacks.

13. The method of claim 12, wherein the thickness $t_k$ of each lower index refraction material and the thickness $t_i$ of each higher index refraction material in each stack is selected to satisfy the equation:

$$n_k t_k = n_i t_i = \lambda_o/4,$$

so that the stack of thin film layers is tailored to reflect electromagnetic radiation at a predetermined resonant wavelength $\lambda_o$ for the stack, where $t_k$, $t_i$, and $\lambda_o$ are different for each of the plurality of stacks.

14. The method of claim 13, wherein in each stack of thin film layers the normal-incidence reflectivity at the resonant wavelength $\lambda_o$ for the stack increases with the number of layered pairs in the stack of thin film layers.

15. The method of claim 13, wherein the number of layered pairs in each stack of thin film layers is a sufficiently large number of layers so that the electromagnetic radiation reflectance of the stack of thin film layers at the resonant wavelength $\lambda_o$ for the stack is nearly 100%.

16. The method of claim 15, wherein the number of layer pairs in at least one of the stacks of thin film layers is 5 to 10.

17. The method of claim 15, wherein the number of layer pairs in at least one of the stacks of thin film layers is more than 10.

18. The method of claim 11, wherein the plurality of stacks of pairs of thin film layers are applied over the entire surface of the macro-scale object.

19. The method of claim 11, wherein the plurality of stacks of pairs of thin film layers are applied over only a partial area of the surface of the macro-scale object.

20. The method of claim 7, wherein the plurality of thin film layers is a plurality of stacks of thin film layers, each stack having alternating indices of refraction with predetermined values and manufactured with predetermined thicknesses so as to be tuned to reflect impinging electromagnetic radiation with a high degree of reflectivity at a predetermined center wavelength, whereby the plurality of thin film layers is reflective over a range of electromagnetic radiation wavelengths and angles of incidence.

21. The method of claim 20, wherein each of the plurality of stacks of thin film layers is designed to be resonant or reflective at a predetermined wavelength lying within an intense part of a spectrum of electromagnetic radiation impinging onto the surfaces of the macro-scale object.

22. The method of claim 20, wherein the plurality of stacks of thin film layers are layered over one another, and wherein each stack is composed of a plurality of layered pairs of thin film layers.

23. The method of claim 22, wherein each pair of thin film layers in each stack consists of a first layer of a first refraction material having a lower refractive index $n_k$ and a second layer of a second refraction material having a higher refractive index $n_i$, where $n_k$ and $n_i$ are different for each of the plurality of stacks.

24. The method of claim 23, wherein the thickness $t_k$ of each lower index first refraction material and the thickness $t_i$ of each higher index second refraction material in each stack is selected to satisfy the equation:

$$n_k t_k = n_i t_i = \lambda_o/4,$$

so that the stack of thin film layers is tailored to reflect electromagnetic radiation at a predetermined resonant wavelength $\lambda_0$ for the stack, where $t_k$, $t_i$, and $\lambda_0$ are different for each of the plurality of stacks.

25. The method of claim 24, wherein the normal-incidence reflectivity at the resonant wavelength $\lambda_0$ for the stack increases with the number of layer pairs in the stack of thin film layers.

26. The method of claim 22, wherein the there are two or more stack of thin film layers that are layered over one another, and wherein each stack is composed of a plurality of layered thin film pairs and the number of stacks is directly related to the broadness of the range of wavelengths reflected by said layered stacks.

27. The method of claim 24, wherein the normal-incidence reflectivity at the predetermined range of resonant wavelengths increases with the number of stacks in the total stack of thin film layers.

28. The method of claim 1, wherein the object is a macro-scale object, and wherein the plurality of layers of alternating materials is a plurality of multiple layer stacks of reflective material coated on at least a portion of the surfaces of the macro-scale object, each reflective material being reflective at a predetermined wavelength of the impinging electromagnetic radiation.

29. The method of claim 28, wherein the plurality of multiple layer reflective materials are deposited on the surfaces of the macro-scale object by at least one method of depositing materials on a surface used in micro-fabrication and nanofabrication, optical coating technology, and/or nanotechnology domains.

30. The method of claim 28, wherein the plurality of multiple layer reflective surfaces are deposited on the surfaces of the macro-scale object by a method selected from the group consisting of Physical Vapor Deposition (PVD); Evaporative Deposition; Electron Beam Physical Vapor Deposition; Sputter Deposition; Cathodic Arc Deposition; Pulsed Laser Deposition; Chemical Vapor Deposition (CVD); Plasma Spray Deposition (PSD); and Thermal Spray Coatings (TSC).

31. The method of claim 28, wherein the plurality of stacks of multiple layer reflective materials are formed from a plurality of materials selected from the group consisting of oxides, ceramics, dielectrics and metallo-dielectrics.

32. The method of claim 1, wherein the plurality of layers have photonic crystals or diffraction gratings within at least one of the material layers.

33. The method of claim 32, wherein the photonic crystals are composed of periodic nanostructures that affect the propagation of electromagnetic radiation in the same way as the periodic potential in a semiconductor crystal affects the electron motion by defining allowed and forbidden electronics energy bands.

34. The method of claim 33, wherein the photonic crystals contain regularly repeating internal regions of high and low dielectric constants made by fabricating periodic structures in dielectrics and/or metallo-dielectrics.

35. The method of claim 32, wherein the photonic crystals are implemented on a surface reflector by periodic diffractive elements being fabricated into the plurality of layers made of alternating materials.

36. The method of claim 35, wherein the periodic nanostructures have a dimensional scale of half the wavelength of the electromagnetic radiation to be reflected.

37. The method of claim 35, wherein the periodic nanostructures are made using micro-fabrication and nanofabrication techniques selected from the group consisting of photolithography, reactive ion etching, ion milling, chemical vapor deposition and wet etching.

38. The method of claim 32, wherein the diffraction gratings are structures with a periodic pattern that diffract or split the impinging electromagnetic radiation into several beams having direct directions.

39. The method of claim 38, wherein the directions of the beams depend on the dimensional spacing of the gratings and the wavelength of the electromagnetic radiation.

40. The method of claim 38, wherein each of the diffraction gratings has a periodic spacing between the reflective elements in the grating at a predetermined wavelength to result in reflected beams of the electromagnetic radiation constructively interfering with one another, whereby the intensity of the reflected electromagnetic radiation from the diffraction grating is substantially 100% at a certain angles that the electromagnetic radiation is incident on the diffraction grating.

41. The method of claim 1, wherein the object is a stationary and is of macro scale dimensions.

42. The method of claim 41, wherein the object is in free flight.

43. The method of claim 1, wherein the object is a moving and is of macro scale dimensions.

44. The method of claim 1, wherein the plurality of layered stacks, together, are reflective over a range of electromagnetic radiation frequencies corresponding to the range of electromagnetic radiation wavelengths over which the plurality of layered stacks are reflective.

* * * * *